United States Patent
Bounds, Jr.

(10) Patent No.: US 6,305,327 B1
(45) Date of Patent: Oct. 23, 2001

(54) NEWBORN AVIAN DELIVERY METHOD AND APPARATUS

(75) Inventor: Edward G. Bounds, Jr., Salisbury, MD (US)

(73) Assignee: Chick Express, Inc., Dover, DE (US)

( * ) Notice: Subject to any disclaimer, the term of this patent is extended or adjusted under 35 U.S.C. 154(b) by 0 days.

(21) Appl. No.: 09/437,055

(22) Filed: Nov. 9, 1999

(51) Int. Cl.[7] .................................................. A01K 37/00
(52) U.S. Cl. ......................... 119/713; 119/843; 119/844; 119/845
(58) Field of Search .................................. 119/713, 840, 119/841, 842, 843, 844, 845, 846, 847, 848, 849; 198/312, 313, 812

(56) References Cited

U.S. PATENT DOCUMENTS

| | | | |
|---|---|---|---|
| Re. 28,708 | * | 2/1976 | Reynolds . |
| 3,420,211 | * | 1/1969 | Hartvickson . |
| 3,706,300 | | 12/1972 | Wessinger . |
| 3,722,477 | | 3/1973 | Weldy et al. . |
| 3,805,743 | * | 4/1974 | Crowder ................................ 119/845 |
| 3,916,835 | * | 11/1975 | Reynolds ............................. 119/401 |
| 4,037,565 | * | 7/1977 | Ledwell, Jr. ........................ 119/846 |
| 4,301,769 | * | 11/1981 | Mola .................................... 119/844 |
| 4,307,683 | * | 12/1981 | Parker, Jr. ............................ 119/716 |
| 4,365,591 | * | 12/1982 | Wills et al. .......................... 119/845 |
| 4,624,357 | | 11/1986 | Oury et al. .......................... 198/313 |
| 4,736,710 | * | 4/1988 | Nicolai ................................ 119/844 |
| 5,060,596 | * | 10/1991 | Esbroeck .............................. 119/453 |
| 5,307,917 | * | 5/1994 | Hall ...................................... 198/313 |
| 5,351,809 | | 10/1994 | Gilmore et al. ..................... 198/812 |
| 5,360,097 | * | 11/1994 | Hibbs ................................... 198/313 |
| 5,487,462 | | 1/1996 | Gilmore ............................... 198/594 |
| 5,699,755 | * | 12/1997 | Wills et al. .......................... 119/846 |
| 5,902,089 | | 5/1999 | Sinn et al. ............................ 414/398 |
| 5,915,338 | | 6/1999 | Fitzsimmons et al. ............. 119/846 |
| 5,975,029 | * | 11/1999 | Morimoto et al. .................. 119/843 |

* cited by examiner

*Primary Examiner*—Charles T. Jordan
*Assistant Examiner*—Yvonne R. Abbott
(74) *Attorney, Agent, or Firm*—Joseph P. Katrick, Esq.

(57) ABSTRACT

Automation of delivery of newborn avian chicks into grow-out houses is accomplished by use of a delivery vehicle which has a powered telescoping conveyor mounted to this vehicle. The vehicle is positioned at one of the personnel doors of a grow-out house and the conveyor extended into the interior of the building. A moving blower is provided at the discharge end of the telescoping conveyor to distribute the chicks over the floor of a grow-out house in such a manner as to prevent piles of chicks from forming.

17 Claims, 5 Drawing Sheets

NEWBORN AVIAN DELIVERY METHOD AND APPARATUS

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A "MICROFICHE INDEX"

Not Applicable

BACKGROUND OF THE INVENTION

1. Field of the Invention

The present invention relates to a method and apparatus for delivering newborn avian chicks to grow-out houses, more particularly to improvements in the method of delivery of these newborn chicks. In addition, this invention relates to an apparatus and method which achieves much greater biosecurity for the newborn chicks, automates the delivery of these chicks, allows for much greater efficiency in the delivery of these chicks, reduces workplace injuries, and minimizes the weather-related deaths of newborn chicks.

2. Description of the Related Art

Historically, newborn avian chicks are loaded for transport to grow-out houses by manually placing approximately 100 chicks into a plastic box which is open at the top with the sides and bottom perforated to allow for air flow. These boxes typically are about 18 inches wide by 24 inches long and 5 inches high. With a per chick average weight of 1.6 ounces and approximately 100 chicks per box, the total weight of the box with chicks averages 15 pounds. The loaded boxes are then nested on top of a wheeled dolly at the hatchery until a vertical column of between eight and ten boxes is stacked. With the average of 100 chicks per box, these vertical columns of boxes will then contain between 800 to 1,000 chicks and range in weight between 120 and 150 pounds.

The wheeled dolly on the bottom of each column of boxes allows for maneuvering within the hatchery and these columns of boxes are pushed or pulled to the back of the delivery vehicle which is usually parked at a loading dock at the hatchery building. Normally, the elevation of loading dock and the floor of the delivery vehicle are within a few inches of each other, allowing for the columns of boxes filled with chicks to be pulled off the wheeled dollies and onto the inside floor of the delivery vehicle. Typically, 20,000 to 60,000 chicks are loaded into the delivery vehicle in this manner.

From the hatchery, the loaded delivery vehicle proceeds to a grow-out house with a crew of two to four workers whose duty it is to unload the chicks from the delivery vehicle and place them in the controlled atmosphere inside the grow-out house. Normally, a grow-out house has large doors on each end and a series of small personnel doors spaced approximately 60 feet apart on one side of the structure. To maintain the integrity of the controlled atmosphere of the grow-out house, the chicks are typically delivered to the interior of the grow-out house through the small personnel doors located on the side of the building instead of through the large end doors.

In order to deliver the chicks to the interior of the grow-out house, the workers carry the boxes of chicks from the delivery truck to the interior of the building and empty the boxes onto the floor. In the past, each worker would carry as many as eight boxes from the vehicle at one time. This procedure caused many injuries to the workers, particularly back-related injuries. A stack of multiple nested boxes is not only heavy and bulky, but is further complicated by a worker needing to navigate over a vertical door threshold which is 6 to 12 inches higher than the exterior grade. In addition, once inside the building, the worker is required to step over two water lines and a feed line which vary in height from 6 to 10 inches higher than the soft litter bed floor. Also, workers experienced many foot and ankle injuries while carrying the heavy and bulky chick boxes over the soft litter bed floor. More recently, because of the numerous injuries as well as the difficulty finding workers willing to perform the manual labor, workers are now being limited in the number of chick boxes that can be carried in one trip to one to four boxes.

Of course, this reduction in the number of boxes that may be carried has reduced the number of employment-related injuries but it has also greatly increased the time required to place the chicks inside the grow-out houses. The number of chicks placed in a grow-out house from one delivery vehicle varies between 12,000 to 30,000 depending on the size of the grow-out house. On the average, about 20,000 chicks equating to approximately 200 boxes are placed in a grow-out house at one time.

Methods and apparatus for loading full grown birds from the grow-out house into a vehicle have been developed but none of these developments address the preceding problems nor address the delivery of newborn avian chicks. For example, U.S. Pat. No. 3,722,477, issued Mar. 27, 1973 describes an apparatus for loading adult poultry into compartments or coops by utilizing a retractable and extendable telescopic conveyor. Through use of this telescoping conveyor, the poultry is delivered first to the rear of the compartment or coop then progressively outward toward the door of this compartment or coop while the telescoping conveyor is being retracted. One of the objects of this design was to eliminate the manual handling of the birds which may cause injury.

Although the potential for injury to the birds may be reduced and the loading of birds into compartments or coops is automated, problems still remain for this apparatus to be beneficial for delivering newborn chicks into a grow-out house. This apparatus is not self-propelled and requires attachment to a powered vehicle for transportation from one location to another. This would create delays in the delivery of the newborn chicks as well as require additional assets and labor for transportation and set-up. Also, the boxes of newborn chicks would need to be unloaded from the delivery vehicle before the chicks are deposited on the conveyor. This necessity does not eliminate weather-related problems and the resulting mortality of the newborn chicks. In addition, the limited movement of the discharge end of this conveyor would result in piles of chicks inside the grow-out house.

Another design for loading poultry with a minimal amount of labor was disclosed in U.S. Pat. No. 5,902,089 issued May 11, 1999. This patent describes a poultry loading apparatus which includes a conveying system that has a telescoping end that extends into and retracts from a coop during the loading process. This system uses hydraulics to control the various functions including conveyor speed, leveling, height adjustment, and the telescoping.

Problems utilizing this design for newborn chicks still remain. The apparatus is not self-propelled and requires additional power, assets, manpower, and time to relocate and set up. Weather also remains a concern regarding the health of the newborn chicks.

The use of suction and air pressure for handling adult poultry is disclosed in U.S. Pat. No. 3,706,300 issued Dec. 19, 1972. The suction is applied to the poultry in a poultry house to urge the same into a conveying conduit, then air pressure is applied forcing the poultry along the conduit and into a suitable conveyance-mounted bin. The poultry conduit described in this patent is not vehicle mounted while the blower is mounted on the conveyance and powered by a gasoline engine.

The method and apparatus described in this patent is not suitable for newborn chicks because the suction and air pressure required to urge the chicks through the conduit would result in an unacceptable mortality rate for the chicks as well as uneven flow that would result in a clogged conduit. Also, the conduit requires an independently powered machine to transport it from location to location.

Still another attempt to solve the difficulties surrounding the loading of full grown turkeys is disclosed in U.S. Pat. No. 5,915,338 issued Jun. 29, 1999. This patent discloses a conveying system that conveys the full grown turkeys to a moveable loading box mounted at the discharge end of the conveyor. From this loading box the turkeys are then unloaded into a coop in a trailer when the exit of the loading box is opened and the support surface is moved to urge the turkeys out of the box and into the coop.

Problems with this system for newborn avian chicks exist. The conveyor is not self-propelled requiring additional manpower, assets, and time to set up. Also, the system only provides for the loading to occur in one coop at a time. Should this system be utilized for newborn avian chicks, the chicks would pile up at the discharge end of the conveyor resulting in high mortality rates.

In summary, various loading and delivery systems for chickens and turkeys are already known. Some devices utilizing these methods include powered conveying systems including telescoping conveyors, retractable telescoping conveyor systems, suction and air, and moving belts within a transportation vehicle. Other designs of extendable and telescoping conveyors exist but none are satisfactory for transporting newborn chicks and will result in unsatisfactory mortality rates.

3. Objects of the Invention

The primary object and purpose of my invention, therefore, is to address the aforementioned problems as well as the problems associated with use of the prior art for chick delivery and provide a method and apparatus for delivering and distributing newborn avian chicks into the interior of a grow-out house in an efficient and bio-effective manor while reducing the need for manual labor to only one worker.

Another object of my invention is to distribute the chicks over a large floor area of the litter bed thus preventing the chicks from piling up vertically which would compromise their ability to breathe sufficient air and therefore suffocate.

It is yet another object of my invention to increase the biosecurity of the grow-out farm by eliminating the need for transporting the plastic chick boxes inside the individual grow-out houses, thereby reducing or eliminating the possibility of cross-contamination between houses or farms. This cross-contamination can be caused by harmful transferrable bacteria or viruses on the surface of the boxes.

It is still another object of my invention to deliver a large number of avian chicks to the interior of the grow-out house in a short period of time.

Yet another object of my invention to substantially reduce or eliminate workplace injuries by eliminating the need to carry boxes of chicks into the grow-out house.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF SUMMARY OF THE INVENTION

According to the present invention, the foregoing and other objects and advantages are attained through a newborn avian chick delivery apparatus and method for unloading chicks into a grow-out house. The apparatus includes a delivery vehicle having a large storage area and which has a telescoping conveyor system with the first section attached to the transportation vehicle in the front of the vehicle directly behind the driver's location and mounted perpendicular to travel of the vehicle. The remaining telescoping sections of conveyor are slidingly mounted to each other and to this first section of conveyor and are stacked underneath this first section of conveyor when in the retracted or travel position.

The infeed end of the telescoping conveyor is the section of conveyor mounted to the delivery vehicle. This infeed section of conveyor remains inside the vehicle while the telescoping sections are manually extended into the grow-out house after the vehicle is aligned with a personnel door. Because the chicks are very light, the conveyor sections do not need to be heavily constructed either. Thus, these extendable conveyor sections may be fabricated from a lightweight material allowing for ease in extension and retraction. The discharge end of the telescoping conveyor is located on the last section of telescoping conveyor. A gently moving blower assembly is operatively connected to the discharge end of this last section of telescoping conveyor. This blower assembly has a stationary receiving chamber and a moving distribution chamber, desirably moving in an oscillating fashion. The moving chamber is in constant motion while the chicks are being delivered to prevent piles of chicks from forming. The chicks are urged from the distribution chamber by the discharge of a blower which delivers low pressure and high volume gas, normally air.

In the best mode, the delivery vehicle is a school bus or similar vehicle having windows to allow for air to circulate throughout the vehicle while the newborn chicks are being transported. If the discharge end of this telescoping conveyor in the extended position is too high or too low, the first section of conveyor which is attached to the delivery vehicle is hinged on the end nearest the grow-out house and the opposite end of this section of conveyor will be supported with an actuator screw, allowing the conveyor, in its extended position, to be raised or lowered by means of the actuator screw to adjust the height of the telescoping conveyor discharge end to a desirable height. A blower and fan assembly that is attached to the discharge end of the telescoping conveyor will gently urge the chicks from the conveyor and onto the floor of the grow-out house. This blower is powered by the same power source used to power the telescoping conveyor and the distribution chamber moves in such a pattern as to allow the chicks to be distributed onto the floor of the grow-out house without a pile being created. This distribution of chicks onto the grow-out house floor is possible without injuring the chicks because the newborn chick's bone structure is very rubbery and the chicks can be dropped a significant distance without injury. Once a chick lands on the grow-out floor, the chick will take a moment to regain its bearings and shortly begin running in some direction away from where it landed. Thus, by changing the location where successive chicks land, a pile will never occur.

Power for the rigidly mounted and telescoping conveyor sections as well as the discharge blower may be provided from the electrical system of the delivery vehicle. An alternative power selection may also be included so that a power cord from the grow-out house could feed a device to convert the AC power from the grow-out house to the power necessary to run the conveyors and distribution device should the vehicle primary power source be unusable.

In the best mode, the sections of telescoping conveyor use belting and are powered by a drive roller which is a self-contained motor eliminating the need for a separate drive power transmission assembly. Thus, the sections of telescoping conveyor can nest in close proximity to each other in the retracted position and in the extended position, the drop from section to section of conveyor is minimal because the discharge end of each telescoping conveyor is angled down to allow for the transition from one section to the next.

Also in the best mode, an alignment device can be mounted on the vehicle and utilized to align the delivery vehicle with the grow-out house side personnel door. This device will allow the vehicle to align itself at the proper horizontal distance from the grow-out house as well as align the centerline of the telescoping conveyor with the approximate centerline of the opening of a side personnel door. Utilization of this device will allow the telescoping conveyor to be extended the proper distance into the grow-out house through one of the personnel doors on the side of the grow-out structure.

The present invention is also a method for unloading newborn avian chicks into a grow-out house. The chicks, which are in boxes, are moved to a dumping position at the infeed end of a conveying means. Once at this dumping position, the newborn chicks are loaded onto this conveying means which transports the newborn chicks to the interior of a grow-out house. Once the chicks have been transported to the inside the grow-out house they are distributed onto the floor of the grow-out house in a constantly moving pattern in order to eliminate piles and the potential for resultant mortality.

The method and apparatus of the invention, using a transportation device, conveying means, and distribution means at the discharge end of the conveying means will deliver a large quantity of newborn chicks to the interior of a grow-out house in a short time frame without the need for a large amount of manual labor. The potential for chick mortality is greatly minimized and the biosecurity increased.

Still other objects and advantages of the present invention will become readily apparent to those skilled in the art from the following detailed description, wherein I have shown and described only the preferred embodiment of the invention, simply by way of illustration of the best mode contemplated by me of carrying out my invention. As will be realized, the invention is capable of other and different embodiments, and its several details are capable of modifications in various obvious respects, all without departing from the invention. Accordingly, the drawing and description are to be regarded as illustrative in nature, and not as restrictive.

DETAILED DESCRIPTION OF THE DRAWINGS

Figure 1:
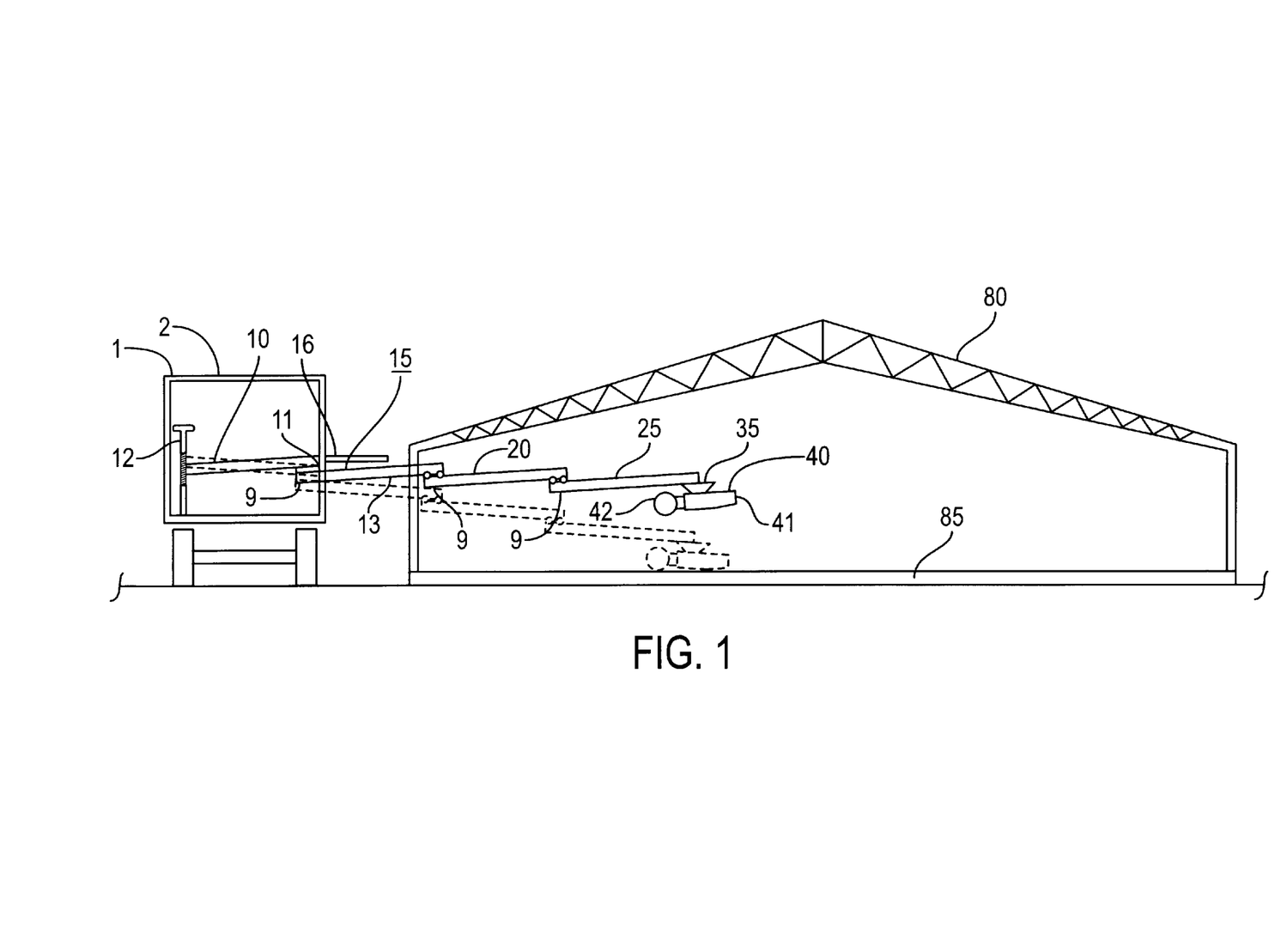
FIG. 1 is a rear elevational view of the delivery vehicle with the rear panel removed showing the telescoping conveyor used in carrying out the method of the present invention with the telescoping conveyor extended into a grow-out house and ready for avian chick delivery.

Referring now to the drawings more particularly to reference numbers wherein like numerals designate corresponding parts throughout the several views, in FIG. 1 there is shown a delivery vehicle and telescoping conveyor assembly which is designated generally by the number 1 comprising a delivery vehicle 2, a series of conveyor sections 10, 15, 20, 25 comprising the telescoping conveyor system 13, a blower receiving chamber 35, and an oscillating blower distribution chamber 40 and blower 42 constructed according to the teachings of the present invention. The telescoping conveyor 13 is shown in its extended position with its discharge 41 being inside a grow-out house 80.

In the preferred embodiment, the stationary topmost belt conveyor which is the first section of conveyor 10 is mounted to one side of the delivery vehicle 2 by means of a hinged attachment 11. The opposite side of this first section of conveyor 10 is mounted to the vehicle by means of an actuator screw mechanism 12. The hinged attachment 11 in cooperation with the actuator screw mechanism 12 will allow the extended telescoping conveyor 13, the blower receiving chamber 35, and the blower distribution chamber 40 and blower 42 to be raised or lowered by turning the actuator screw mechanism 12. This adjustment raises or lowers the conveyor and allows the blower distribution chamber 40 to be at a desirable height from the litter bed floor 85 to compensate for topographical or other variations. The dotted lines of the conveyor system 13, blower receiving chamber 35, blower distribution chamber 40, and blower 42 in FIG. 1 indicate the possible range of adjustment. The first telescoping belt conveyor 15 is protected from the weather and other elements by a fixed cover on part of the topmost area of belt conveyor 15 and an access door 16, which, in the preferred embodiment, will contain a visible pointer and horizontal measurement sensor 22 to allow for positioning of the delivery vehicle at the proper location for extension of the telescoping conveyor into a grow-out house through a personnel door the needed amount.

The first telescoping belt conveyor section 15 is attached to the stationary topmost conveyor section 10 by means of a track and cam roller assembly 9 allowing for these sections of conveyor to be slidingly engaged. Likewise, the second telescoping belt conveyor section 20 is attached in a similar fashion to the first telescoping conveyor section 15 and the third telescoping belt conveyor 25 is also attached to the second telescoping belt conveyor section in the same fashion. If needed, additional conveyor sections may be added.

Figure 2:
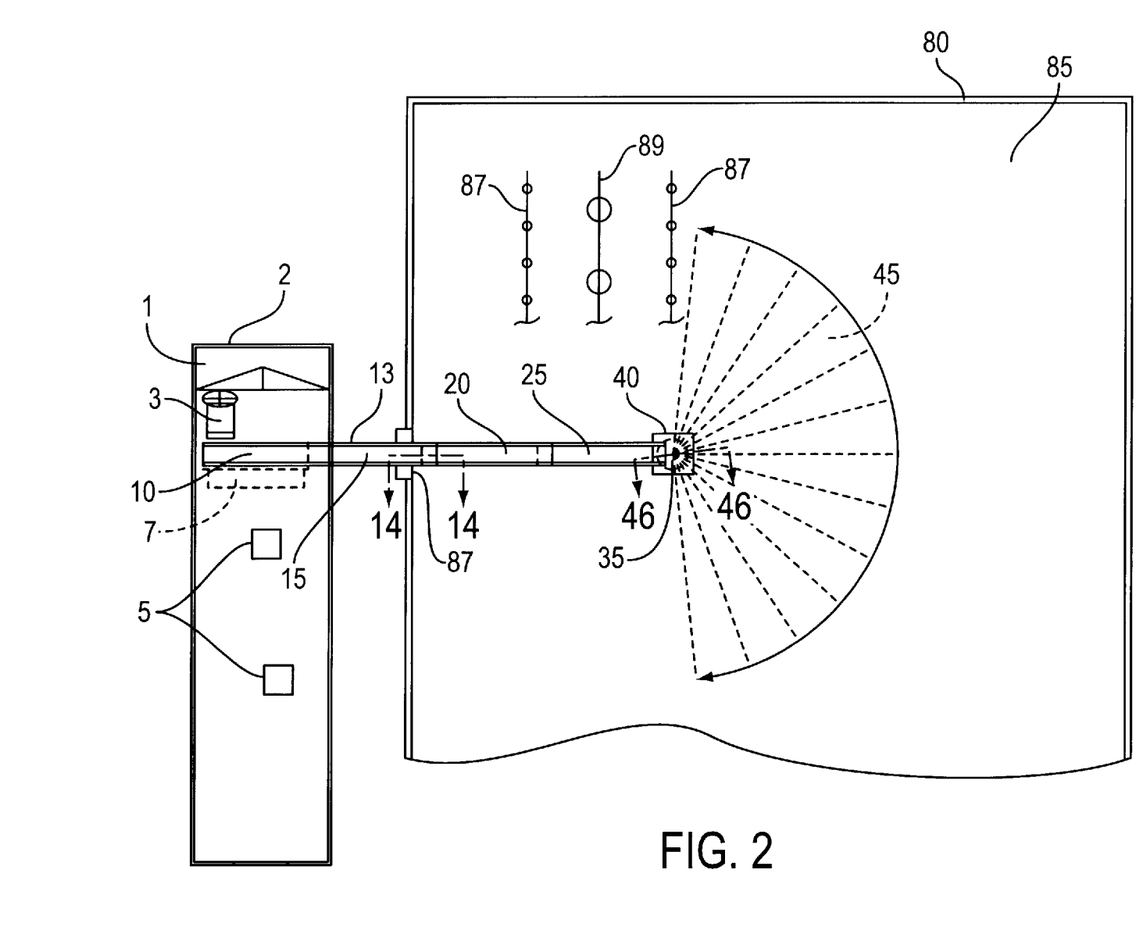
FIG. 2 is a plan view of the delivery vehicle and telescoping conveyor used in carrying out the method of the present invention with the telescoping conveyor extended into a grow-out house.

In FIG. 2, there is shown the avian chick delivery system 1, the delivery vehicle 2 which has a driver's location 3. In the preferred embodiment, the stationary topmost belt conveyor section 10 is mounted directly behind the driver's location and perpendicular to the direction of delivery vehicle 2 travel.

In preparation for operation, the telescoping conveyor sections 15, 20, and 25 are manually extended into a grow-out house 80 through a personnel door 87.

In operation, an operator works in the area 7 next to the stationary topmost conveyor 10 and takes boxes of chicks 5 and dumps them onto the stationary topmost belt conveyor section 10. The chicks are conveyed from the topmost belt conveyor section 10 to the first telescoping belt conveyor 15, then to the second telescoping belt conveyor section 20 and finally to the third telescoping belt conveyor 25 from which the chicks are delivered to the blower receiving chamber 35. The chicks then fall into the blower distribution chamber 40 where, in the preferred embodiment, they are gently blown onto the floor 85 of a grow-out house 80 in an oscillating pattern 45. For illustration and clarification purposes only, the location of the water lines 87 and feed supply line 89 are indicated on this figure.

Figure 3:
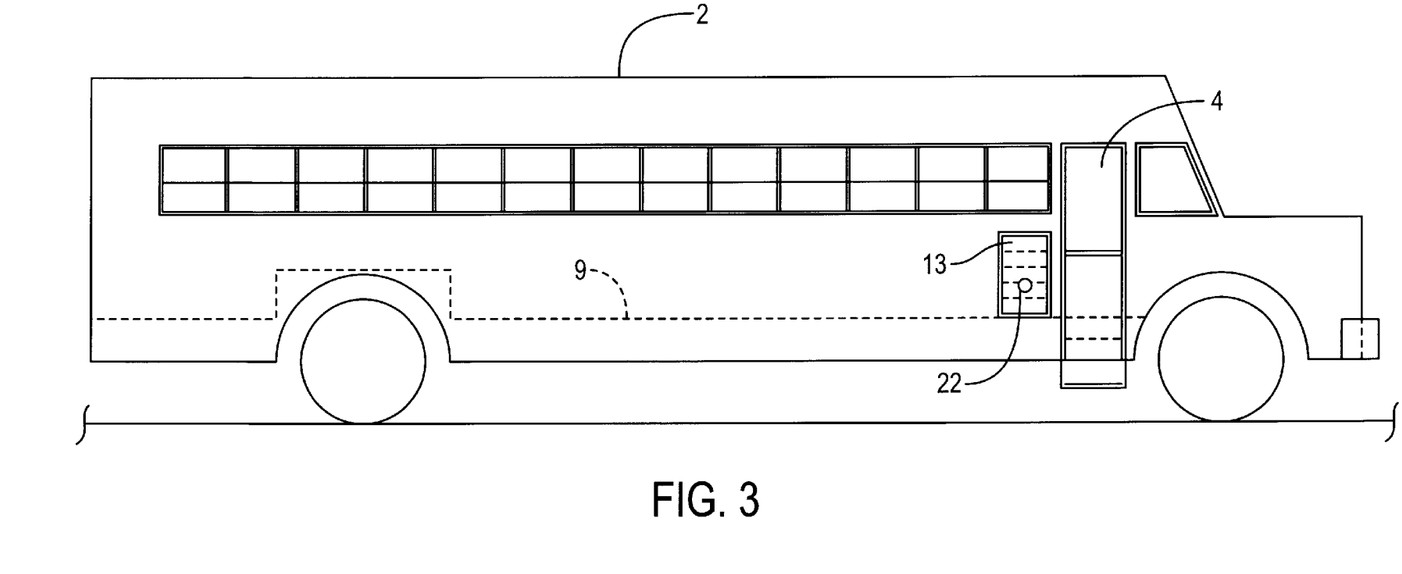
FIG. 3 is a side elevational view of the delivery vehicle with the telescoping conveyor retracted and conveyor door closed.

FIG. 3 illustrates the delivery vehicle 2 having a floor 9. The telescoping conveyor system 13 shown in its retracted position is mounted toward the front of the vehicle and a visible pointer and horizontal measurement sensor 22 is located in proximity to this conveyor system 13. A personnel access opening 4 is provided to the delivery vehicle 2. In operation, the visible pointer will horizontally align the delivery vehicle with the approximate center of a personnel door and the measurement sensor will allow the delivery vehicle to position itself at a proper distance from the personnel door so that the telescoping conveyor 13 can be extended into a grow-out house the needed distance.

Figure 4:
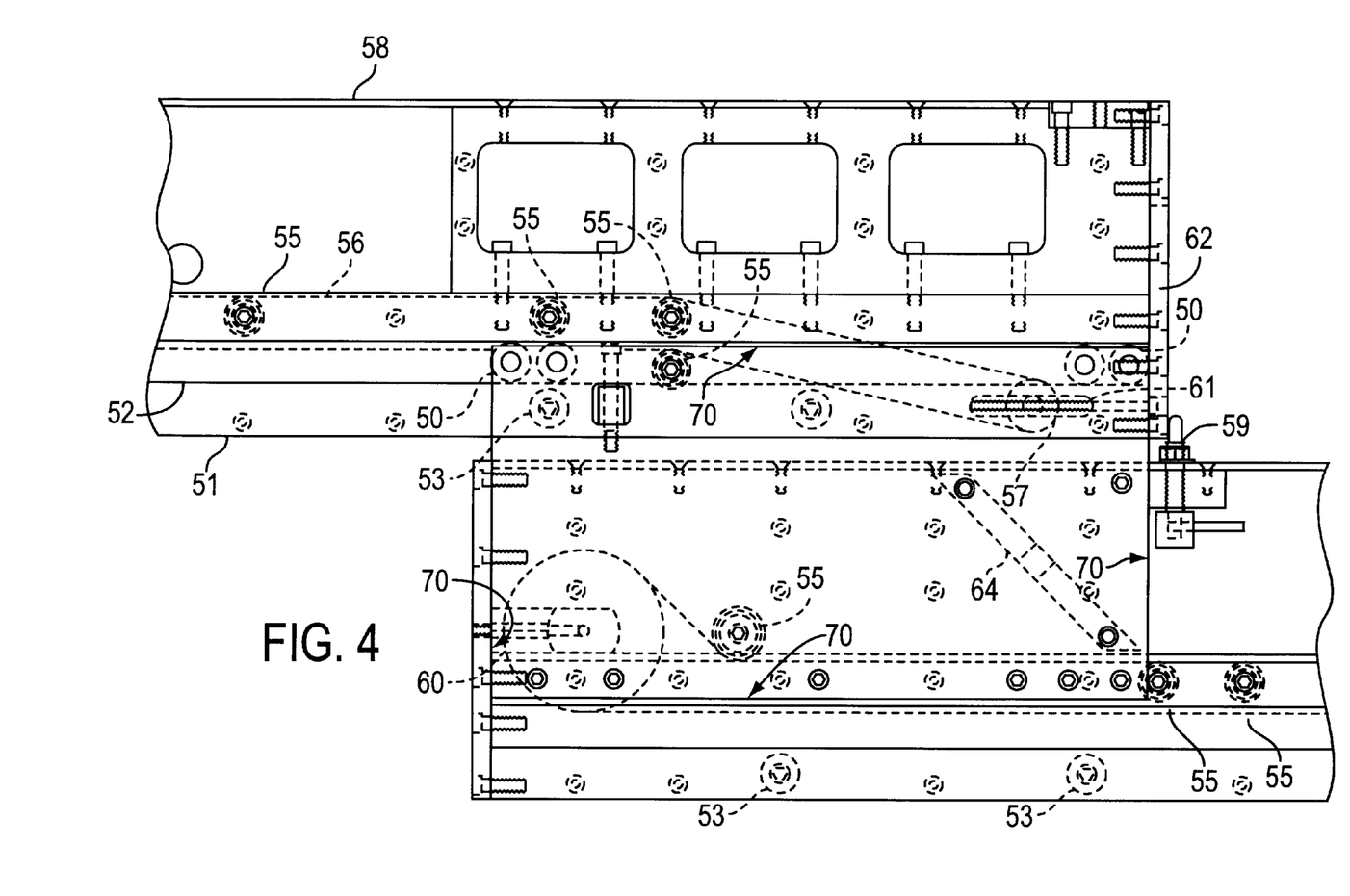
FIG. 4 is a sectional view taken along the line 14—14 of FIG. 2 showing the interconnection of adjacent telescoping conveyor sections.

FIG. 4 illustrates the interconnection of telescoping conveyor sections through use of rotating cam rollers 50 mounted to the roller transition plate 70 and these rollers ride in a track 52. Rigid cross members 53 provide additional support to both sides of the conveyor framing 51. An end plate 62 is provided at the end of each conveyor section for both support and to direct the chicks to the next section of conveyor. Spring-loaded plungers 59 are provided on the moveable conveyor sections to lock the conveyor sections in the extended position. When retraction of the conveyor sections is desired, these spring-loaded plungers 59 are disengaged from the conveyor frame and the telescoping section of conveyor thereby released is slid under the next upper adjoining section. A conveyor belt 56 which runs below the top of the conveyor frame 58 is supported by idler rollers 55 through its travel and is driven by a self-contained powered roller 60. The tail roller 57 is adjustable by means of a take-up assembly 61 on each side of the conveyor which allows for tracking of the belt as well as tensioning to eliminate slippage. A chute 64 is provided to allow the chicks to slide from the discharge of one section of telescoping conveyor onto the next section of telescoping conveyor.

Figure 5:
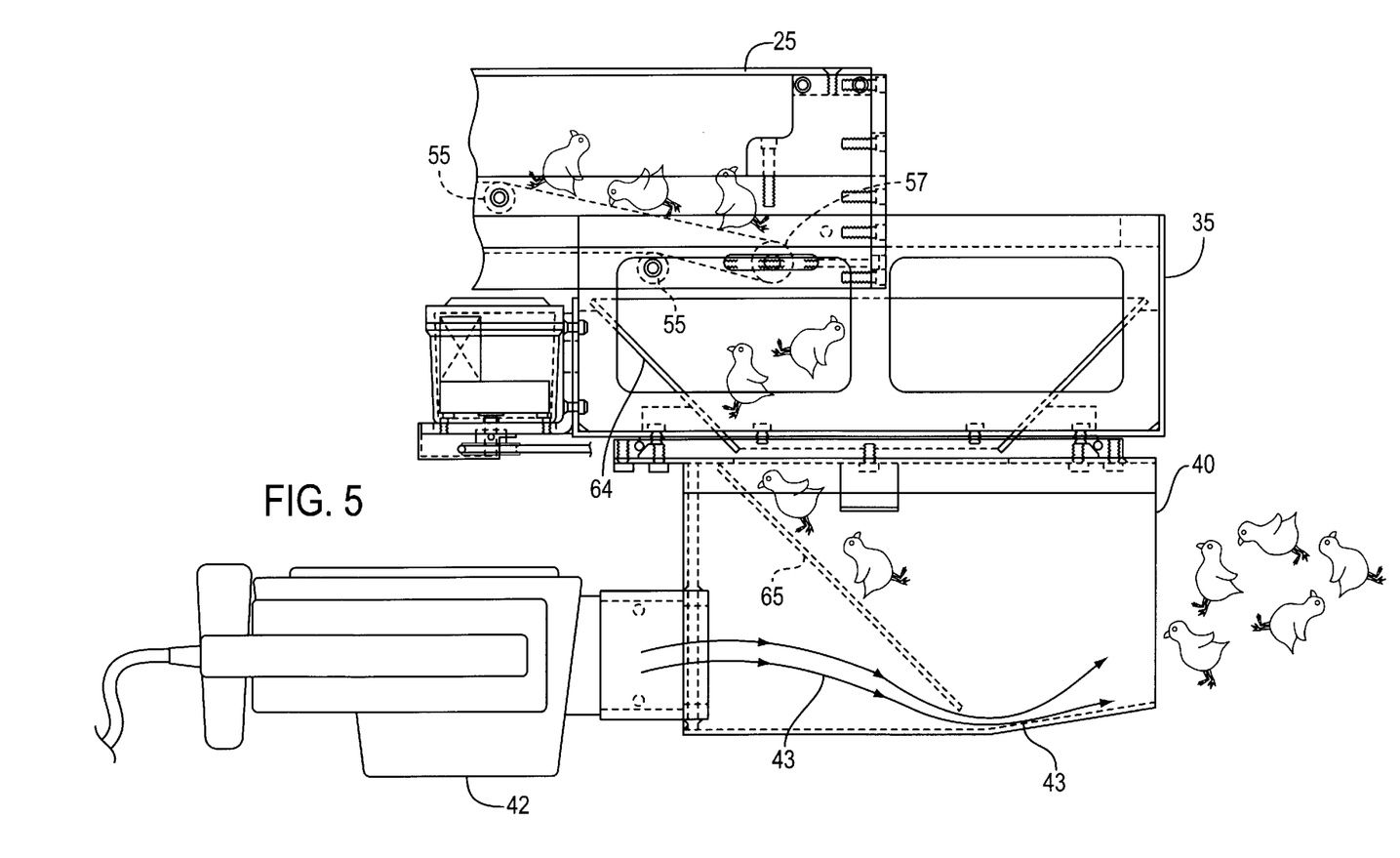
FIG. 5 is a sectional view taken along the line 46—46 of FIG. 2 showing the detail of the blower receiving chamber and the blower distribution chamber mounted on the discharge end of the last telescoping belt conveyor section.

FIG. 5 illustrates the blower receiving chamber 35, the blower distribution chamber 40, and the blower 42. The chicks are transported to the end of the last or bottom-most telescoping belt conveyor section and are discharged from the end of this conveyor 57 into a hopper 64. The chicks fall through this hopper 64 by gravity and fall onto a chute 65. The chicks continue falling down this chute into a stream of air 43 which blows them out the far end of the distribution chamber 40. A blower 42 supplies this air and is sealingly attached to the distribution chamber 40. In the preferred embodiment, the distribution chamber 40 and blower 42 oscillate through an arc intended to distribute the chicks onto the floor 85 of a grow-out house 80 in such a manner as to prevent piling of the chicks at one location.

Changes and modifications in the specifically described embodiments can be carried out without departing from the principles of the invention. For example, although the invention is illustrated as having three telescoping units, its principles may be applied to a fewer or greater telescoping units. While a particular embodiment of the invention has been shown and described, many embodiments may be made of this invention, and inasmuch as various changes may be made in the embodiments described above, it is to be understood that all matter herein described and/or shown in the accompanying drawings is to be taken as illustrative, and not by way of limitation.

I claim:

1. A method for delivering newborn avian chicks into a grow-out house comprising the steps of:
    (a) loading newborn chicks into a delivery vehicle;
    (b) transporting newborn chicks from a hatchery to a grow-out house by means of said delivery vehicle;
    (c) introducing the newborn chicks onto the infeed end of a conveying system mounted on said delivery vehicle;
    (d) transporting these said chicks into the interior of a grow-out house by use of this said conveying system;
    (e) distributing these said chicks from said conveying system onto the floor of a grow-out house in a manner which will prevent piles.

2. The method as recited in claim 1, wherein the chicks are loaded onto the delivery vehicle in trays.

3. The method as recited in claim 1, wherein the said conveying system is operating as the newborn chicks are introduced.

4. The method as recited in claim 1, wherein the said conveying system having sections which operate at incrementally faster speeds to reduce piles of chicks on the conveyor system.

5. The method as recited in claim 1, wherein the chicks are distributed onto the floor of the grow-out house through a distribution chamber.

6. The method as recited in claim 5, wherein a light blast of a gaseous material is used to urge the chicks from the said distribution chamber.

7. The method as recited in claim 6, wherein the gaseous material is air.

8. The method as recited in claim 5, wherein the said distributing chamber is in constant motion while the chicks are being distributed.

9. The method as recited in claim 8, wherein the said distributing chamber oscillates through an arc.

10. An apparatus for delivering newborn avian chicks into a grow-out house comprising:
    (a) a delivery vehicle;
    (b) a telescoping conveyor mounted to said delivery vehicle, said telescoping conveyor having a fixed section and multiple telescoping sections supported by said fixed section, an infeed end and a discharge end wherein said telescoping sections may be adjustably positioned between fully nested under said fixed section and fully extended outwardly from said fixed section;
    (c) a means mounted to the said discharge end of said telescoping conveyor for discharging the chicks from the said telescoping conveyor.

11. The apparatus as recited in claim 10, wherein the telescoping conveyor is mounted perpendicular to the direction of travel of said delivery vehicle.

12. The apparatus as recited in claim 10, further comprising a telescoping belt conveyor.

13. The apparatus as recited in claim 12, further comprising a powered telescoping belt conveyor.

14. The apparatus as recited in claim 10 wherein the said discharging means is a distribution chamber.

15. The apparatus as recited in claim 14, wherein a powered blower is attached to the said distribution chamber.

16. The apparatus as recited in claim 10, further comprising a powered blower at said discharge end of said telescoping conveyor.

17. The apparatus as recited in claim 10, further comprising a locator system for alignment of the said delivery vehicle with a personnel door of a grow-out house.

\* \* \* \* \*